(12) United States Patent
Akiyama et al.

(10) Patent No.: US 7,285,581 B2
(45) Date of Patent: Oct. 23, 2007

(54) PROCESSED PIGMENTS, PIGMENT-DISPERSED SOLUTION, INK FOR INK JET, MANUFACTURING METHOD OF PROCESSED PIGMENTS AND MANUFACTURING METHOD OF PIGMENT-DISPERSED SOLUTION

(75) Inventors: Ryozo Akiyama, Mishima (JP); Toru Ushirogouchi, Yokohama (JP); Kazuhiko Ohtsu, Mishima (JP)

(73) Assignee: Toshiba Tec Kabushiki Kaisha (JP)

( * ) Notice: Subject to any disclaimer, the term of this patent is extended or adjusted under 35 U.S.C. 154(b) by 621 days.

(21) Appl. No.: 10/785,750

(22) Filed: Feb. 24, 2004

(65) Prior Publication Data
US 2004/0259976 A1   Dec. 23, 2004

(30) Foreign Application Priority Data
Jun. 18, 2003   (JP)   ............................. 2003-173236

(51) Int. Cl.
*C09D 11/10*   (2006.01)

(52) U.S. Cl. ...................... 523/160; 523/161

(58) Field of Classification Search ............... 523/160, 523/161, 130–131
See application file for complete search history.

(56) References Cited

U.S. PATENT DOCUMENTS

| | | | |
|---|---|---|---|
| 3,150,166 A | | 9/1964 | Pohlemann et al. |
| 5,716,435 A | * | 2/1998 | Aida et al. ............... 106/31.85 |
| 5,747,599 A | * | 5/1998 | Ohnishi .................... 525/327.3 |
| 5,889,084 A | | 3/1999 | Roth |
| 5,928,419 A | * | 7/1999 | Uemura et al. .............. 106/493 |
| 6,323,257 B1 | * | 11/2001 | Moffatt et al. ............... 523/160 |
| 6,417,283 B1 | * | 7/2002 | Ikeda et al. .............. 525/326.1 |
| 6,849,111 B2 | * | 2/2005 | Suzuki et al. ............ 106/31.65 |
| 6,903,172 B2 | * | 6/2005 | Hayashi ....................... 526/204 |
| 6,959,986 B2 | * | 11/2005 | Ushirogouchi et al. ..... 347/100 |
| 7,119,130 B2 | * | 10/2006 | Sasa ............................ 522/170 |
| 2003/0135059 A1 | | 7/2003 | Matsumura et al. |
| 2004/0069182 A1 | * | 4/2004 | Nakajima ................. 106/31.13 |
| 2004/0102543 A1 | * | 5/2004 | Sasa ............................ 523/160 |
| 2004/0166253 A1 | | 8/2004 | Sasa |
| 2005/0113483 A1 | | 5/2005 | Takabayashi |
| 2005/0154092 A1 | * | 7/2005 | Liu et al. ..................... 523/458 |
| 2005/0228078 A1 | * | 10/2005 | Kuo et al. ................... 523/400 |

FOREIGN PATENT DOCUMENTS

| | | |
|---|---|---|
| EP | 1 070 592 A1 | 1/2001 |
| EP | 1 167 043 A1 | 1/2002 |
| JP | 63-265913 | 11/1988 |
| JP | 11-293144 | 10/1999 |
| JP | 11-322900 | 11/1999 |
| JP | 2001-220526 | 8/2001 |
| JP | 2001-294777 | 10/2001 |
| JP | 2002-302507 | 10/2002 |
| JP | 2005-139275 | 6/2005 |
| WO | WO93/17867 | 9/1993 |

OTHER PUBLICATIONS

Communication from European Patent Office re: related application, (Oct. 2005).
Communication from European Patent Office re: related application, (Nov. 2005).
Communication from Japanese Patent Office regarding related application. (Sep. 2006).

* cited by examiner

*Primary Examiner*—Peter Szekely
(74) *Attorney, Agent, or Firm*—Harness, Dickey & Pierce, P.L.C.

(57) ABSTRACT

There is disclosed a processed pigment comprising a pigment having a dispersing agent adsorbed physically and/or chemically onto part of the surface of the pigment, and a cationic polymerizable compound bonded through a covalent bond to the surface of the pigment. Preferably, the cationic polymerizable compound is formed of an alicyclic epoxy compound.

11 Claims, No Drawings

PROCESSED PIGMENTS, PIGMENT-DISPERSED SOLUTION, INK FOR INK JET, MANUFACTURING METHOD OF PROCESSED PIGMENTS AND MANUFACTURING METHOD OF PIGMENT-DISPERSED SOLUTION

CROSS-REFERENCE TO RELATED APPLICATIONS

This application is based upon and claims the benefit of priority from the prior Japanese Patent Application No. 2003-173236, filed Jun. 18, 2003, the entire contents of which are incorporated herein by reference.

BACKGROUND OF THE INVENTION

1. Field of the Invention

The present invention relates to processed pigments, a pigment-dispersed solution, an ink for ink jet, a manufacturing method of processed pigments and a manufacturing method of a pigment-dispersed solution.

2. Description of the Related Art

Dyes and pigments have been conventionally employed as a coloring material in the manufacture of paints, various inks such as a printing ink, an ink for ink-jet and an writing ink, and plastic resins. Pigments are required to be excellent and stable in dispersibility in a solvent component into which pigments are dispersed. Therefore, in order to realize an optimum dispersed state of pigments, various dispersion techniques have been studied to date.

Examples of such dispersion techniques include a method of applying surface treatments to pigments to ensure stable dispersibility, such surface treatments including rosin treatment, surface treatment using a surfactant, treatments using a pigment derivative or treatments using a polymer. For example, there is known a method of manufacturing a carbon black graft polymer wherein carbon black is employed as a pigment and mixed with a polymer having in its molecule 1-2 epoxy group and/or thioepoxy group per molecule at a temperature ranging from 50 to 250° C., thereby allowing a reaction to take place for producing the carbon black graft polymer.

There is also known a method wherein a reactive polymer is employed for enhancing the dispersibility of pigments.

In the case of an ink which is relatively low in viscosity such as an ink for ink-jet, pigments are required to have excellent dispersion properties in order to ensure sufficiently high storage stability and excellent discharge stability of the ink, as well as to secure high quality of printed images. When a large quantity of polymer is employed in the aforementioned method, the viscosity of ink increases, thereby deteriorating the discharge properties of ink, even though the storage stability can be ensured. On the other hand, when pigments are subjected to surface treatment using a surfactant, the storage stability of ink deteriorates. Namely, to date, no one has succeeded in finding a technique which is capable of satisfying all of the requirements involved in the pigment dispersibility.

BRIEF SUMMARY OF THE INVENTION

The present invention has been accomplished in view of the aforementioned problems, and therefore, one of the objects of the present invention is to provide processed pigments which are capable of exhibiting excellent dispersibility, a pigment-dispersed solution where such pigments are employed, and an ink for ink jet where such pigments are employed.

Another object of the present invention is to provide a method of manufacturing processed pigments which are excellent in dispersibility as well as in stability, and a method of manufacturing a pigment-dispersed solution where processed pigments can be stably dispersed.

According to one aspect of the present invention, there is provided a processed pigment comprising:

a pigment having a dispersing agent adsorbed physically and chemically onto part of the surface of the pigment; and a cationic polymerizable compound which is bonded through a covalent bond to the surface of the pigment.

According to another aspect of the present invention, there is provided a pigment-dispersed solution comprising:

an organic solvent; and a processed pigment dispersed in the organic solvent, the processed pigment comprising a pigment having a dispersing agent adsorbed physically and chemically onto part of the surface of the pigment; and a cationic polymerizable compound which is bonded through a covalent bond to the surface of the pigment.

According to another aspect of the present invention, there is provided an ink for ink-jet, which comprises:

a processed pigment comprising a pigment having a dispersing agent adsorbed physically and chemically onto part of the surface of the pigment; and a cationic polymerizable compound which is bonded through a covalent bond to the surface of the pigment;

an epoxy compound having a viscosity of not higher than 50 mPa·s under normal pressure and at a temperature of 50° C. and provided with alicyclic skeleton and/or aliphatic skeleton, the epoxy compound being polymerizable in the presence of an acid; and a photo-acid generating agent which is capable of generating an acid as it is irradiated with light.

According to another aspect of the present invention, there is provided a method for manufacturing the processed pigment of the present invention, the method comprising a step of:

bonding a cationic polymerizable compound, via covalent bonding, to a surface of the pigment through a direct reaction between the cationic polymerizable compound and a surface of the pigment.

According to another aspect of the present invention, there is provided a method for manufacturing a pigment-dispersed solution, the method comprising the steps of:

dispersing a pigment in an organic solvent to thereby prepare a preliminary dispersed solution;

adding a cationic polymerizable compound to the preliminary dispersed solution to thereby allow a reaction to take place between the pigment and the cationic polymerizable compound, thereby causing the cationic polymerizable compound to covalently bond to a surface of the pigment; and removing the organic solvent to obtain the pigment-dispersed solution wherein the pigment is dispersed in the cationic polymerizable compound.

Additional objects and advantages of the invention will be set forth in the description which follows, and in part will be obvious from the description, or may be learned by practice of the invention. The objects and advantages of the invention may be realized and obtained by the instrumentalities and combinations particularly pointed out hereinafter.

DETAILED DESCRIPTION OF THE INVENTION

Next, various embodiments of the present invention will be explained in detail as follows.

The processed pigment according to one embodiment of the present invention comprises a pigment, a dispersing agent and a cationic polymerizable compound.

As for the pigments useful in the present invention, they may be either organic pigments or inorganic pigments, provided that they have, on the surface thereof, a functional group capable of linking with the cationic polymerizable compound through a covalent bond. More specifically, it is possible to employ pigments having, on their surfaces, carboxylic group or acid anhydride; lactone; phenolic hydroxyl group; etc.

Specific examples of such pigments include carbonaceous pigment such as carbon black, refined carbon and carbon nanotube; metal oxide pigments such as iron black, cobalt blue, zinc oxide, titanium oxide, chromium oxide and iron oxide; sulfide pigments such as zinc sulfide; phthalocyanine pigments; pigments formed of salts such as metal sulfate, metal carbonate, metal silicate and metal phosphate; and pigments formed of metal powder such as aluminum powder, bronze powder and zinc powder.

More specifically, specific examples of carbon black include Color Black FW200, Color Black FW2, Color Black FW2V, Special Black 6, Special Black 5, Special Black 4, Special Black 4A, Printex 150T, etc. (all, Dexa Co., Ltd.).

Further, in order to introduce any required functional groups into organic pigments so as to make the organic pigments useful in the embodiment of the present invention, the organic pigments may be subjected to a surface treatment such as an oxidation treatment using ozone, a treatment using hydrogen peroxide, a treatment using a solution of potassium permanganate, etc.

As for the examples of the organic pigments, they include, for example, dye chelate (basic dye type chelate, acidic dye type chelate, etc.); nitro pigments; aniline black; nitroso pigments such as naphthol green B; azo pigments (including azo lake, insoluble azo pigment, condensed azo pigment, chelate azo pigment) such as Bordeaux 10B, Lake red 4R and chromophthal red; Lake pigments such as Peacock blue lake and Rhodamine lake; phthalocyanine pigments such as phthalocyanine blue; polycyclic pigments (such as perylene pigment, perinone pigment, anthraquinone pigment, quinacridone pigment, dioxane pigment, thioindigo pigment, isoindolinone pigment, quinophthalene pigment, etc.); threne pigments such as thioindigo red and indanthrone blue; quinacridine pigment; and isoindolinone pigment.

The processed pigments according to one embodiment of the present invention can be suitably employed in the preparation of the ink for ink-jet. In this case, an average particle diameter of aforementioned pigments should preferably be as small as possible. More specifically, an average particle diameter of these pigments should preferably be not larger than 1/10 of the diameter of the opening of nozzle through which the liquid ink is discharged. Incidentally, the diameter of the opening of the nozzle is typically not larger than 5 μm. Therefore, a preferable particle diameter of these pigments should be not larger than 0.35 μm if they are to be employed in a printing ink.

On part of the surface of these pigments, a dispersing agent is adsorbed physically and/or chemically. As for the dispersing agents useful in this case, it is possible to employ nonionic or ionic surfactants and charge control agents.

Further, it is also possible to suitably employ polymer type dispersing agents such as acryl and vinyl alcohol having characteristics similar to the aforementioned surfactants. However, when a cationic dispersant is employed as a dispersing agent, it is advisable to select those having a lower acidity than that of carboxylic acids, because some of cationic dispersants may promote the dark reaction to cure the ink. Further, since dispersants and dyes which are strong in basicity also act not only to deteriorate the sensitivity of the ink but also to promote the dark reaction to cure the ink, the dispersants should be selected from those which are close to neutral or nonionic in nature.

The residual region of the surface of pigment other than the region thereof where a dispersing agent is adsorbed is linked through covalent bond with a cationic polymerizable compound.

As for specific examples of the cationic polymerizable compound, they include compounds having a cyclic ether group such as epoxy group, oxetane group, oxirane group, etc.; acrylic or vinyl compounds having these substituent groups on their side chains; carbonate-based compounds; low molecular melanin compounds; monomers having a cationically polymerizable vinyl linkage such as vinyl ethers, vinyl carbazoles, styrene derivatives, alfa-methylstyrene derivatives, and vinyl alcohol esters such as esters between vinyl alcohol and acrylic acid, methacrylic acid, etc. It is also possible to employ an oligmer including at least one monomer aforementioned.

Among these compounds, it is preferable to employ polymerizable compounds having an epoxy group and being excellent in acid-polymerizability. Specific examples of such compounds include compounds which are provided with a hydrocarbon group having a bivalent aliphatic skeleton and/or alicyclic skeleton having 1 to about 50 carbon atoms, or provided with an epoxy group or alicyclic epoxy group which is attached to at least one of bivalent groups having a partial aliphatic chain and/or an alicyclic skeleton. As for the examples of such cationic polymerizable compounds, it is possible to employ the compounds represented by the following general formulas.

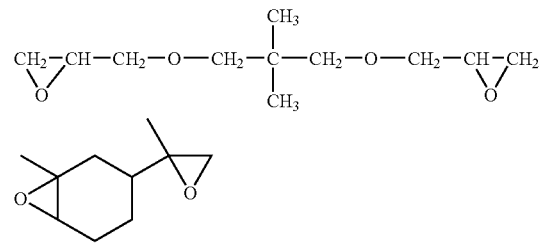

Although there is no particular limitation with regard to the number of epoxy groups to be introduced into the aforementioned molecular skeleton, it is preferable that the valence number should be at most two or three. As for the examples of such polymerizable compounds, it is possible to employ the compounds represented by the following general formulas (1) and (2):

In these general formulas (1) and (2), $R^1$, $R^2$ and $R^3$ represent individually an epoxy group or epoxy group having an alicyclic skeleton; and $A^1$ and $A^2$ represents a bivalent substituent group and a monovalent substituent group, respectively, n is 0 or 1.

Specific examples of the bivalent substituent group to be introduced as $A^1$ into the general formula (1) are the groups shown below:

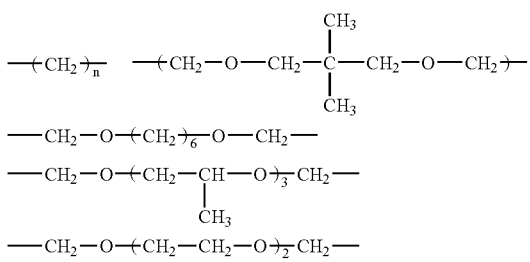

Specific examples of the monovalent substituent group to be introduced as $A^2$ into the general formula (2) are the groups shown below:

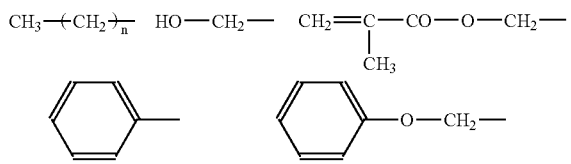

Incidentally, with respect to the general formula (1), it may be formed of a structure where $R^1$ and $R^2$ are directly linked with each other without the intervention of $A^1$.

The epoxy compounds represented by the general formulas (1) and (2) are generally low in viscosity, i.e. ranging from 1 cP to about 30 cP. Therefore, the employment of these epoxy compounds of low viscosity is effective in sufficiently lowering the viscosity of a pigment-dispersed solution.

Further, the alicyclic epoxy compounds represented by the following general formula (3) are generally high in viscosity, i.e. ranging from about 20 cP to about 500 cP. Therefore, the employment of these epoxy compounds of high viscosity is effective in providing a suitable hardness to a cured matter of an ink and the like which has been prepared using a pigment-dispersed solution.

In the aforementioned general formula (3), $R^4$ and $R^5$ represent individually an epoxy group or epoxy group having an alicyclic skeleton; and $A^3$ is a (k+1) valent substituent group (k is a natural number) having at least an alkylene group and/or an alicyclic skeleton.)

The aforementioned compounds of low or high viscosity should preferably be employed in such a manner that at least one low viscosity compound is mixed together with at least one high viscosity compound. For example, when 5 to 90 parts by weight of low viscosity compound is mixed with 1 to 40 parts by weight of high viscosity compound per 100 parts by weight of a film-forming solution, it would be advantageous in realizing a suitable degree of fluidity which is required for the ink for ink-jet (i.e. a viscosity of 50 cP or less at a temperature of 50° C.). In particular, it is preferable to mix together the low viscosity compound and high viscosity compound at a weight ratio of about 1:1 to 10:1.

As for the examples of the aforementioned alicyclic epoxy compounds, they include alicyclic epoxy compounds such as Celloxide 2021, Celloxide 2021A, Celloxide 2021P, Celloxide 2081, Celloxide 2000 and Celloxide 3000 (DAICEL chemical Industries Ltd.); (metha)acrylate compounds having epoxy group, such as Cyclomer A200 and Cyclomer M100; methacrylate having methylglycidyl group such as MGMA; GD glycidol representing a low molecular epoxy compound; β-methylepichlorohydrin; PNO; α-pinene oxide; α-olefin monoepoxide having 12 to 14 carbon atoms; α-olefin monoepoxide having 16 to 18 carbon atoms; epoxidized soy bean oil such as Dimac S-300K; epoxidized linseed oil such as Dimac L-500; and polyfunctional epoxy compounds such as Epolead GT301 and Epolead GT401. It is also possible to employ alicyclic epoxy compounds (such as Cylacure; Dow Chemical Co., Ltd, U.S.); low molecular weight phenol compounds which are hydrogenated and aliphatized with the terminal hydroxyl group thereof being substituted by a group having epoxy; glycidyl ether compounds of aliphatic alcohol/alicyclic alcohol such as ethylene glycol, glycerin, neopentyl alcohol, hexanediol, trimethylol propane; and glycidyl esters of hexahydrophthalic acid or hydrogenated aromatic polyhydric carboxylic acid.

If the alicyclic skeleton included in the aforementioned epoxy compounds is formed of a terpenoid skeleton, the safety of the processed pigment, the processed pigment-dispersed solution and the ink, as well as a cured matter of the ink with regard to human body as well as to the environment would be enhanced. Examples of such epoxy compounds include epoxidized compounds that can be derived from the oxidation of unsaturated linkage of terpene-based compounds having an unsaturated linkage such as myrcene, ocimene, geraniol, nerol, linalol, citrorenol, citral, menthene, limonene, dipentene, terpinolene, terpinene, phellandrene, sylvestrene, piperithol, terpineol, menthenemonol, isopregol, perary aldehyde, piperitone, dihydrocarvone, carvone, pinol, ascaridole, sabinene, carene, pimene, bornene, fenchene, camphene, carveol, sesquiterpene, diterpene, triperpene, etc.

The processed pigment according to one embodiment of the present invention can be manufactured by allowing the surface of a pigment to react with a cationic polymerizable compound.

For example, it is possible to employ a method wherein a pigment having carboxylic group as a reactive functional group on its surface is incorporated into and mixed with a cationic polymerizable compound under ordinary temperature, thereby allowing a reaction to take place. As a result, it is possible to obtain a processed pigment wherein the pigment having the cationic polymerizable compound linked to the surface of the pigment is dispersed in the cationic polymerizable compound can be obtained. In the processed pigment thus obtained, the cationic polymerizable compound is linked through covalent bond to the reactive group of the surface of pigment. When an additive such as a polymer for enhancing dispersibility or a dispersing agent is further mixed with this processed pigment, the additive attach to the unreacted portion of the surface of pigment by physical and/or chemical adsorption, thereby further enhancing the dispersibility of the processed pigment.

As already explained above, the total surface area of the pigment should not be occupied by the bonding of the cationic polymerizable compound, but should be partially occupied by the dispersing agent which is chemically and/or physically adsorbed thereto. As long as the cationic polymerizable compound is linked to the surface of pigment, it is possible to derive the effects of the cationic polymerizable compound. However, in order to secure a sufficient dispersibility, it is preferable that the cationic polymerizable compound is linked be at least 5% of the surface of the pigment. On the other hand, if the ratio of the cationic polymerizable compound bonding to the surface of pigment is too high, the cohesive force among the pigment particles would be excessive, thereby possibly deteriorating the dispersibility of the pigment. Therefore, the ratio of the cationic polymerizable compound bonding to the surface of pigment should preferably be confined to 60% or less based on the entire area of the surface of pigment. More preferably, the ratio of the cationic polymerizable compound bonding to the surface of pigment should be confined within the range of 10% to 50% based on the total surface area of the pigment.

Alternatively, the pigment-dispersed solution according to one embodiment of the present invention may be obtained in such a way that a mixed solution comprising an organic solvent and a cationic polymerizable compound is employed and reacted with a pigment to obtain the pigment-dispersed solution. More specifically, first of all, a cationic polymerizable compound is added to an organic solvent to prepare a mixed solution. As for the organic solvent useful in this case, it is possible to employ, for example, MEK (methylethyl ketone), THF (tetrahydrofuran), esters such as ethyl acetate, ketone, ether-based solvent, etc. To this mixed solution, a pigment having a carboxyl group as a reactive functional group is added, the resultant mixture being subsequently stirred under ordinary temperature to allow a reaction to take place. As a result, a pigment-dispersed solution wherein a processed pigment having the cationic polymerizable compound linked to part of the surface of pigment is dispersed in the mixed solution can be obtained. In this case also, it is possible to secure an enhanced dispersibility by allowing an additive to adsorb onto the surface of the pigment according to the aforementioned procedure.

Furthermore, it is also possible to adopt a method wherein a pigment is preliminarily dispersed in an organic solvent to obtain a mixed solution, into which a cationic polymerizable compound is incorporated to allow the cationic polymerizable compound to react with the pigment. For this preliminary dispersion, the pigment is dispersed into the solvent by using a dispersing agent so as to allow the dispersing agent to bond to part of the surface of the pigment, thereby rendering the pigment relatively low in dispersibility thereof. As for the organic solvent used in this case, it is possible to employ, for example, MEK, THF, esters such as ethyl acetate, ketone, ether-based solvent, etc. Further, the pigment may not be dispersed to such a level where the pigment is dispersed as primary particles in the organic solvent. In this case also, it is possible to obtain a pigment-dispersed solution wherein a processed pigment is dispersed in the mixed solution comprising an organic solution and a cationic polymerizable compound.

If an organic solvent which is relatively low in boiling point is employed in the aforementioned procedure, the organic solvent can be removed by using a suitable distillation apparatus, thereby obtaining a pigment-dispersed solution where the processed pigment is dispersed in a cationic polymerizable compound. In this case, an organic solvent which is not only incapable of hindering the reaction between a cationic polymerizable compound and a pigment but also capable of being easily removed after the reaction between a cationic polymerizable compound and a pigment can be employed. More preferably, the organic solvent can be selected from those having a boiling point Ta which is lower than the boiling point Tb of the cationic polymerizable compound ($100°$ C.<|Ta—Tb|) Further, it is advisable on the occasion of preliminarily dispersing a pigment in an organic solvent that the organic solvent should be suitably selected from those which are incapable of deteriorating the surface features of the pigment. Namely, the organic solvent may be selected from, for example, MEK, THF, esters such as ethyl acetate, ketone, ether-based solvent, etc.

Since the processed pigment according to one embodiment of the present invention is constructed such that a cationic polymerizable compound is linked to the surface of pigment by covalent bond, the processed pigment is excellent in dispersibility. Therefore, the processed pigment according to one embodiment of the present invention is capable of exhibiting excellent dispersibility even against a hydrophobic organic solvent which has been conventionally considered very difficult to enable pigments to be uniformly dispersed therein. Namely, since the processed pigment can be excellently and stably dispersed even in a hydrophobic solution, the processed pigment is not influenced by the viscosity or the particle diameter of pigment, and is hence excellent in storage stability.

With respect to the pigments that can be employed herein, the particle diameter thereof may widely range from $0.01$ μm to several micrometers, and the specific surface area thereof may widely range from several square meters/g to several hundred square meters/g. These physical features give an extensive influence to the coloring property as a coloring matter as well as to the dispersibility thereof. Therefore, on the occasion of dispersing the pigment in a cationic polymerizable compound or in an organic solvent, the pigments should preferably be pulverized into as close to the primary particle as possible and dispersed uniformly therein. The processed pigment having the aforementioned desirable features can be manufactured by using a dispersing machine which is capable of physically agitating pigments sufficiently. Therefore, it is preferable, for enabling a pigment to react with a cationic polymerizable compound, to employ a dispersing machine which is capable of suitably performing the dispersion of pigments. For example, it is possible to employ a ball mill, a sand mill, a paint shaker, an ultrasonic homogenizer, etc.

The state of linkage between the surface of pigment and the cationic polymerizable compound in the processed pigment thus obtained can be confirmed by IR spectral analysis. For example, spectral analysis will be performed on a cationic polymerizable compound having an alicyclic epoxy group, and then, on a processed pigment which is obtained through a reaction between the cationic polymerizable compound and a pigment having, on the surface thereof, carboxyl group, lactone or phenolic hydroxyl group. Thereafter, the absorption peaks thus obtained are compared with each other to confirm the linkage that has been created from the reaction between the surface of pigment and the cationic polymerizable compound.

The processed pigment prepared as described above is mixed with a solvent of ink together with a photo-acid generating agent which is capable of generating an acid as it is irradiated with light, thereby obtaining an ink for ink-jet according to one embodiment of the present invention.

As for the ink solvent, there is no particular limitation, as long as it meets the below-mentioned characteristics. However, an especially optimum solvent can be selected from those where a cationic polymerizable compound is employed and which can be employed as a coloring material in an ink whose curing can be promoted by an acid. The ink for ink-jet is required to be excellent in discharge stability, in quality of printed image and in storage stability. In this connection, the dispersibility of pigment incorporated as a coloring matter plays an important role in realizing any of these desirable properties. Further, as for the specific physical properties of ink that should be controlled, they include viscosity, surface tension, electrical conductivity, volatility and the particle diameter of pigment. Among them, the control of viscosity is important and hence the viscosity of ink should be preferably confined within a predetermined range (or, to suppress any increase in viscosity).

Specifically, the ink solvent may be selected from epoxy compounds having a viscosity of not higher than 50 mPa·s under normal pressure and at a temperature of 50° C. and provided with an alicyclic skeleton and/or aliphatic skeleton, the epoxy compound being polymerizable in the presence of an acid. Even though the environment in which the discharging action of ink is takes place varies, the viscosity of ink is required to be 50 mPa·s or less at most in an environment of 50° C. which is considered to be the most severe environment for the ink. If the viscosity of ink is higher than 50 mPa·s, the discharging of ink may become unstable or result in the discharge failure of ink. Further, even in the ordinary environment of room temperature, the viscosity of ink should preferably be confined, likewise, to 50 mPa·s at most, or less.

As for the epoxy compounds which can be preferably employed in a liquid ink having a viscosity of 50 cp (=mPa·s) at most, they may be combined with each other in any manner as long as the resultant mixture of epoxy compounds is capable of achieving a viscosity of 50 cp or less. For example, very viscous epoxy compounds having a viscosity ranging from several hundreds to several thousands cp may be made employable if such a viscous epoxy compound is combined with an epoxy compound of as low as several cp in viscosity. Therefore, usually, almost all of the aforementioned epoxy compounds can be employed. When "n" kinds of acid-polymerizable compounds are mixed together for use in an ink, if the resultant composition is formulated in such a way that the viscosity $\eta_t$ represented by the following formula (1) would become 50 (mPa·s), the viscosity of ink would be confined to 50 cp or less. Therefore, such a combination of compounds would be preferable for use. Generally, it is more preferable that these compounds are combined so as to make the viscosity $\eta_t$ thereof fall within the range of 5 (mPa·s) to 30 (mPa·s).

$$\eta_t = \exp(\chi_1 \cdot \ln(\eta_1) + \chi_2 \cdot \ln(\eta_2) + \chi_3 \cdot \ln(\eta_3) + \ldots + \chi_n \cdot \ln(\eta_n)) \quad (1)$$

(wherein $\chi_1, \chi_2, \chi_3 \ldots \chi_n$ are weight ratios of each component; and $\eta_1, \eta_2, \eta_3 \ldots \eta_n$ are intrinsic viscosities of the individual components)

If the viscosity $\eta_t$ falls outside of this range, the discharge of ink may become very difficult or disturbance of image may be caused to occur due to irregular discharging of ink.

As for the photo-acid generating agent, specific examples include onium salt, diazonium salt, quinone diazide compounds, organic halide compounds, aromatic sulfonate compounds, bisulfone compounds, sulfonyl compounds, sulfonate compounds, sulfonium compounds, sulfamide compounds, iodonium compounds, sulfonyl diazomethane compounds and mixtures of these compounds.

In the preparation of the ink for ink-jet, 3-10 parts by weight of a pigment, 60-90 parts by weight of an epoxy compound, and 1-10% by weight (based on the quantity of the epoxy compound) of a photo-acid generating agent are uniformly mixed together. The resultant mixture is then filtered by using a PTFE filter to obtain an ink for ink-jet according one embodiment of the present invention.

Incidentally, the content of pigments in the ink for ink-jet according to one embodiment of the present invention should preferably be confined within the range of 1 to 25% by weight. If the content of the pigments is less than 1% by weight, the color density would become too low. On the other hand, if the content of the pigments is higher than 25% by weight, the discharging property of the ink would be deteriorated.

The processed pigments according to one embodiment of the present invention are applicable likewise, in addition to the ink for ink-jet, to a liquid having a relatively low viscosity and containing a pigment dispersed therein. Examples of such a liquid of relatively low viscosity include gravure ink, screen ink and toner for liquid development. Further, it is also possible to employ the processed pigments as a coloring material for plastic molded articles, or in a relatively viscous color material such as paint and printing ink. Since the processed pigments according to one embodiment of the present invention are excellent in dispersion stability irrespective of the end-use thereof, the storage stability of the resultant color material employing the processed pigments would be excellent, thus making it possible to obtain almost the same effects as explained above.

Next, the embodiments of the present invention will be explained in detail with reference to the following specific examples.

EXAMPLE 1

By using a pigment, a dispersing agent and a cationic polymerizable compound shown below, a processed pigment was prepared.

Carbon black (Color Black FW2; Dexa Co., Ltd.): 10 parts by weight

Solsperse 24000 (Avicia Co., Ltd.): 10 parts by weight

SR-NPG (neopentylglycol diglycidyl ether; Sakamoto Yakuhin Kogyo Co., Ltd.): 80 parts by weight First of all, Solsperse 24000 employed as a dispersing agent was dissolved in SR-NPG employed as a cationic polymerizable compound to obtain a solution. To this solution were added carbon black as a pigment and 100 parts by weight of zirconia beads (1 mm in diameter) as a dispersing medium to obtain a mixture, which was then subjected to dispersion treatment by using a paint shaker for 5 hours, thereby allowing a reaction to take place in the mixture, thus obtaining a processed pigment. The processed pigment thus obtained was constructed in a state wherein pigment was uniformly dispersed in the cationic polymerizable compound.

EXAMPLE 1-1

The same procedures as described in Example 1 were repeated except that C3000 (limonene dioxide; DAICEL chemical Industries, Ltd.) representing an alicyclic epoxy compound was substituted for the cationic polymerizable compound of Example 1, thereby obtaining a processed pigment wherein pigment was uniformly dispersed in the cationic polymerizable compound.

EXAMPLE 1-2

The same procedures as described in Example 1 were repeated except that oxetane OXT-101 (Toa Gousei, Co., Ltd.) representing a cyclic ether compound was substituted for the cationic polymerizable compound of Example 1, thereby obtaining a processed pigment wherein the pigment was uniformly dispersed in the cationic polymerizable compound.

EXAMPLE 1-3

The same procedures as described in Example 1 were repeated except that CHVE (1,4-cyclohexane dimethanol divinylether; ISP, Co., Ltd.) representing a vinyl ether compound was substituted for the cationic polymerizable compound of Example 1, thereby obtaining a processed pigment wherein the pigment was uniformly dispersed in the cationic polymerizable compound.

EXAMPLE 2

The processed pigment prepared in Example 1-1, an epoxy compound and a photo-acid generating agent were mixed together according to the following recipe and then, subjected to filtration by using a PTFE filter 5 μm in mesh size, thereby preparing an ink for ink-jet.

Processed pigment of Example 1-1: 50 parts by weight
SR-NPG (neopentylglycol diglycidyl ether; Sakamoto Yakuhin Kogyo Co., Ltd.): 50 parts by weight
UVACURE 1591 (DAICEL UCB Co., Ltd.): 8 parts by weight Incidentally, the viscosity of SR-NPG employed as an epoxy compound was about 7 cp under ordinary pressure and at a temperature of 50° C.

EXAMPLE 3

By using a pigment, a dispersing agent, a cationic polymerizable compound and an organic solvent shown below, a pigment-dispersed solution was prepared.

Carbon black (Color Black FW2; Dexa Co., Ltd.): 10 parts by weight
Solsperse 24000 (Avicia Co., Ltd.): 10 parts by weight
C3000 (limonene dioxide; DAICEL chemical Industries, Ltd.): 10 parts by weight
Isoper (Exon Co., Ltd.): 70 parts by weight First of all, Solsperse 24000 employed as a dispersing agent was added to Isoper employed as an organic solvent to obtain a solution. To this solution were added carbon black as a pigment and 100 parts by weight of zirconia beads (1 mm in diameter) as a dispersing medium to obtain a mixture and the aforementioned mixture was then subjected to dispersion treatment by using a paint shaker for 3 hours. Subsequently, C3000 employed as a cationic polymerizable compound was added to the aforementioned mixture and the resultant mixed solution was then subjected to dispersion treatment by using a paint shaker for 3 hours, thereby allowing a reaction to take place in the mixed solution. As a result, it was possible to obtain a pigment-dispersed solution wherein the processed pigment was uniformly dispersed in the mixed solution comprising the organic solvent and the cationic polymerizable compound.

EXAMPLE 4

By using a pigment, a dispersing agent, a cationic polymerizable compound and an organic solvent shown below, a pigment-dispersed solution was prepared.

Carbon black (Color Black FW200; Dexa Co., Ltd.): 10 parts by weight
Solsperse 24000 (Avicia Co., Ltd.): 10 parts by weight
C3000 (limonene dioxide; DAICEL chemical Industries, Ltd.): 80 parts by weight
MEK: 100 parts by weight First of all, Solsperse 24000 employed as a dispersing agent was added to MEK employed as an organic solvent to obtain a solution. To this solution were added carbon black as a pigment and 100 parts by weight of zirconia beads (1 mm in diameter) as a dispersing medium to obtain a mixture and the aforementioned mixture was then subjected to dispersion treatment by using a paint shaker for 3 hours. Subsequently, C3000 employed as a cationic polymerizable compound was added to the aforementioned mixture and the resultant mixed solution was then subjected to dispersion treatment by using a paint shaker for 3 hours, thereby allowing a reaction to take place in the mixed solution.

Then, by using a rotary evaporator, MEK was removed by vacuum distillation, thus preparing a processed pigment-dispersed solution, wherein the carbon black was uniformly dispersed in the C3000 representing a cationic polymerizable compound.

COMPARATIVE EXAMPLE 1

By using a pigment, a dispersing agent and a cationic polymerizable compound shown below, a processed pigment was prepared.

Carbon black (Color Black FW2; Dexa Co., Ltd.): 10 parts by weight
Solsperse 24000 (Avicia Co., Ltd.): 10 parts by weight
Isoper (Exon Co., Ltd.): 80 parts by weight First of all, Solsperse 24000 employed as a dispersing agent was dissolved in Isoper employed as a solvent to obtain a solution. To this solution were added carbon black as a pigment and 100 parts by weight of zirconia beads (1 mm in diameter) as a dispersing medium to obtain a mixture, which was then subjected to dispersion treatment by using a paint shaker for 5 hours, thus obtaining a processed pigment.

COMPARATIVE EXAMPLE 2

By using a pigment, a dispersing agent and a cationic polymerizable compound shown below, a processed pigment was prepared.

Carbon black (Printex 60; Dexa Co., Ltd.): 10 parts by weight
Solsperse 24000 (Avicia Co., Ltd.): 10 parts by weight
SR-NPG (neopentylglycol diglycidyl ether; Sakamoto Yakuhin Kogyo Co., Ltd.): 80 parts by weight First of all, Solsperse 24000 employed as a dispersing agent was dissolved in SR-NPG employed as a cationic polymerizable compound to obtain a solution. To this solution were added carbon black as a pigment and 100 parts by weight of zirconia beads (1 mm in diameter) as a dispersing medium to obtain a mixture, which was then subjected to dispersion by using a paint shaker for 5 hours, thereby allowing a reaction to take place in the mixture, thus obtaining a processed pigment. The processed pigment thus obtained was constructed in a state wherein the carbon black was dispersed in the epoxy compound.

The components included in the processed pigment, etc. of the aforementioned Examples and Comparative Examples are summarized in the following Table 1.

TABLE 1

|  |  | Examples |  |  |  |  |  |  | Comparative Examples |  |
|---|---|---|---|---|---|---|---|---|---|---|
|  |  | 1 | 1-1 | 1-2 | 1-3 | 2 | 3 | 4 | 1 | 2 |
| Carbon black | Color Black FW20 | 10 | 10 | 10 | 10 | 5 | 10 |  | 10 |  |
|  | Color Black FW200 |  |  |  |  |  |  | 10 |  |  |
|  | Printerx60 |  |  |  |  |  |  |  | 10 |  |
| Cationic polymerisable compounds | SR-NPG | 80 |  |  |  | 50 |  |  |  | 80 |
|  | Celloxide 3000 |  | 80 |  |  | 40 | 10 | 80 |  |  |
|  | Oxetane OXT-101 |  |  | 80 |  |  |  |  |  |  |
|  | Vinyl ether compound |  |  |  | 80 |  |  |  |  |  |
| Solvent | Isoper |  |  |  |  |  | 70 |  | 80 |  |
|  | MEK |  |  |  |  |  |  | (100) |  |  |
| Dispersing agent | Solsperse 24000 | 10 | 10 | 10 | 10 | 5 | 10 | 10 | 10 | 10 |
| Acid-generating agent | UVACURE 1591 |  |  |  |  | 8 |  |  |  |  |

By IR spectral analysis, the state of linkage between the surface of pigment and the cationic polymerizable compound in the processed pigment was confirmed. As a result, it was possible, in the processed pigments of the above-described Examples, to recognize an absorption peak which was not recognizable in the cationic polymerizable compound. More specifically, the peak was that of ester bonding, which was assumed as generated as a result of the reaction between the pigment and the cationic polymerizable compound. Namely, the cationic polymerizable compound was introduced into the surface of the pigment through this chemical linkage.

Further, it was also possible, through the quantitative assay of the alicyclic ether functional group, to confirm the quantity of the linkage between the cationic polymerizable compound and the pigments. In this quantitative assay, it was revealed that the reactivity of C3000 was especially high and that the ratio of covalent bond thereof with the carbon black (Color Black FW2) was not less than three times as high as that of SR-NPG. When the reactivity between the cationic polymerizable compound having a cyclic ether group and the pigments was investigated, there was found a tendency in general of: C3000>alicyclic epoxy>epoxy>cyclic ether (oxetane, oxirane, etc.). This tendency is expected to have relevance to the dispersibility of the processed pigment so that it is conceivable that the higher the reactivity of a compound is, the higher the capability thereof to suppress the deterioration of dispersibility of pigment that causes the coagulation among pigment particles and the weakly bonding among pigment particles.

As already explained above, it is required that the surface of the pigment is provided with a functional group which is capable of reacting with a cationic polymerizable compound, and that the surface of the pigment has at least some degree of acidity. When the surface of the pigment of Comparative Example 2 was observed by of IR spectral analysis, the absorption peak of an ester linkage, which is considered as a criterion of judging the bonding state, was not present. In view of this, it will be recognized that the surface of Printex 60 is almost free from the aforementioned functional group.

Furthermore, by using the processed pigments, etc. of the aforementioned Examples and Comparative Examples as samples, the rate of change in viscosity of these samples was investigated.

First of all, by using a rotary E-type viscometer (Tokyo Keiki Co., Ltd.), the viscosity of each sample at 25° C. was measured. Then, these samples were left to stand for 30 days in an environment of 50° C. and then, the viscosity of each of samples was again measured at 25° C. Thereafter, the rate of change in viscosity of these samples was calculated, the obtained results being summarized in the following Table 2.

TABLE 2

|  | Examples |  |  |  |  |  |  | Comparative Examples |  |
|---|---|---|---|---|---|---|---|---|---|
|  | 1 | 1-1 | 1-2 | 1-3 | 2 | 3 | 4 | 1 | 2 |
| Thickening rate | 9% | 9% | 8% | 8% | 8% | 7% | 7% | 12% | 12% |

If the rate of change in viscosity is confined within 10%, the sample can be considered as acceptable.

As shown in Table 2, the processed pigments, the pigment-dispersed solutions and the inks for ink-jet according to the embodiments of the present invention were all not higher than 10% in the thickening rate, thus indicating that the processed pigment was stably dispersed. Whereas, in the case of Comparative Example 1, due to the absence of the cationic polymerizable compound, the thickening rate was as high as 12%. In the case of Comparative Example 2, the thickening rate was further increased up to as high as 20%. It will be recognized from the results of Comparative Example 2 that even if a cationic polymerizable compound is incorporated, if there is no covalent bond on the surface of carbon black Printex 60 employed as a pigment, it is impossible to enhance the storage stability of the processed pigment.

As explained above, according to some of the aspects of the present invention, it is possible to provide processed pigments which are capable of exhibiting excellent dispersibility, a pigment-dispersed solution which employs such pigments, and an ink for ink jet which employs such pigments.

According to other aspects of the present invention, it is possible to provide a method of manufacturing processed pigments which are excellent in dispersibility as well as in stability, and a method of manufacturing a pigment-dispersed solution where processed pigments can be stably dispersed.

The present invention can be effectively utilized especially for the preparation of various inks which are relatively low in viscosity such as inks for ink-jet, and therefore, the present invention is very valuable from an industrial viewpoint.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method for manufacturing a pigment-dispersed solution, the method comprising:
    dispersing a pigment in an organic solvent to prepare a preliminary dispersed solution;
    adding a cationic polymerizable compound to the preliminary dispersed solution to react the pigment with the cationic polymerizable compound, thereby causing the cationic polymerizable compound to covalently bond to a surface of the pigment, the cationic polymerizable compound having a boiling point higher than that of the organic solvent; and
    removing the organic solvent to obtain the pigment-dispersed solution wherein the pigment is dispersed in the cationic polymerizable compound.

2. The method according to claim 1, wherein the organic solvent is selected from the group consisting of ester-based solvents, ketone-based solvents and ether-based solvents.

3. The method according to claim 1, wherein the pigment is selected from the group consisting of carbonaceous pigments, metal oxide pigments, sulfide pigments, phthalocyanine pigments, metal salts and metal powder.

4. The method according to claim 1, wherein an average particle diameter of the pigment is 0.35 μm or less.

5. The method according to claim 1, wherein the cationic polymerizable compound is an epoxy compound having an alicyclic skeleton.

6. The method according to claim 1, wherein the wherein the cationic polymerizable compound is an epoxy compound selected from the group consisting of a compound represented by the following general formula (1), a compound represented by the following general formula (2) and a compound represented by the following general formula (3):

$$R^1-A^1{}_n-R^2 \qquad (1)$$

$$R^3-A^2 \qquad (2)$$

$$R^4-A^3-R^5{}_k \qquad (3)$$

where $R^1$, $R^2$ and $R^3$ represent individually an epoxy group or epoxy group having an alicyclic skeleton; and $A^1$ and $A^2$ represent a bivalent substituent group and a monovalent substituent group, respectively, n is 0 or 1; $R^4$ and $R^5$ represent individually an epoxy group or epoxy group having an alicyclic skeleton; and $A^3$ is a (k+1) valent substituent group (k is a natural number) having at least an alkylene group and/or an alicyclic skeleton.

7. The method according to claim 1, wherein the cationic polymerizable compound is selected from the group consisting of:

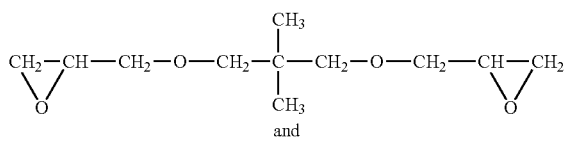

and

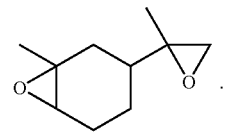

8. The method according to claim 6, wherein the bivalent substituent group to be introduced as said $A^1$ into the general formula (1) is selected from the group consisting of:

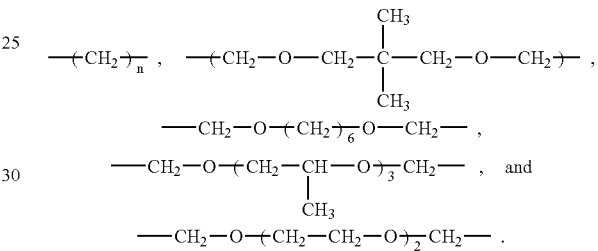

9. The method according to claim 6, wherein the monovalent substituent group to be introduced as said $A^2$ into the general formula (2) is selected from the group consisting of:

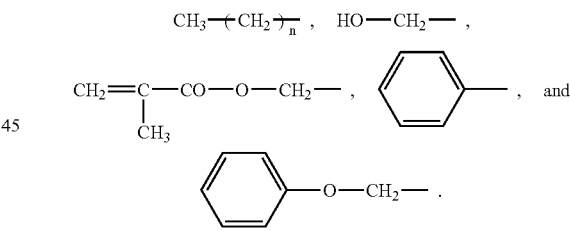

10. The method according to claim 5, wherein the alicyclic skeleton is a terpenoid skeleton.

11. The method according to claim 1, wherein the cationic polymerizable compound is bonded to at least 5% of the surface of the pigment.

* * * * *